United States Patent [19]

Crane

[11] 4,334,425
[45] Jun. 15, 1982

[54] SHIP EFFICIENCY ANALYZER

[76] Inventor: Harold E. Crane, 5015 River Rd., New Orleans, La. 70123

[21] Appl. No.: 142,372

[22] Filed: Apr. 18, 1980

[51] Int. Cl.³ ............................................. G01L 3/26
[52] U.S. Cl. ........................................................... 73/112
[58] Field of Search ..................... 73/112, 116, 117.3; 235/92 CA; 364/431, 432, 551

[56] References Cited

U.S. PATENT DOCUMENTS

| | | | |
|---|---|---|---|
| 1,293,155 | 2/1919 | Martindale | 73/112 |
| 3,683,684 | 8/1972 | Judlowe . | |
| 3,686,935 | 8/1972 | May | 73/112 X |
| 3,750,465 | 8/1973 | Howell et al. | 73/117.3 |
| 3,972,224 | 8/1976 | Ingram . | |
| 3,998,093 | 12/1976 | Bertolasi | 73/112 |
| 4,215,412 | 7/1980 | Berner et al. | 364/431 |
| 4,267,569 | 5/1981 | Bawmann | 364/431 |

FOREIGN PATENT DOCUMENTS

| | | | |
|---|---|---|---|
| 745378 | 2/1956 | United Kingdom | 73/112 |
| 892953 | 4/1962 | United Kingdom | 73/112 |
| 613217 | 6/1978 | U.S.S.R. | 73/112 |

Primary Examiner—James J. Gill
Attorney, Agent, or Firm—Schwartz, Jeffery, Schwaab, Mack, Blumenthal & Koch

[57] ABSTRACT

A system for indicating the presence of fuel penalties brought on by inefficient power plant components or degradation in performance of components. The system is adapted for use especially in marine applications and includes strategically located continuous operating sensors, the information from which is sampled and analyzed to produce an output representative of the plant efficiency at that moment. The outputs include indications of fuel use per hour, fuel consumption per distance traveled, and power plant efficiency. A plurality of secondary inputs are provided giving indications of the plant operating pressures, temperatures, etc. When a fuel penalty is indicated, the secondary inputs are evaluated to determine any significant change in output levels thus giving evidence as to the location of the source of the fuel penalty.

10 Claims, 6 Drawing Figures

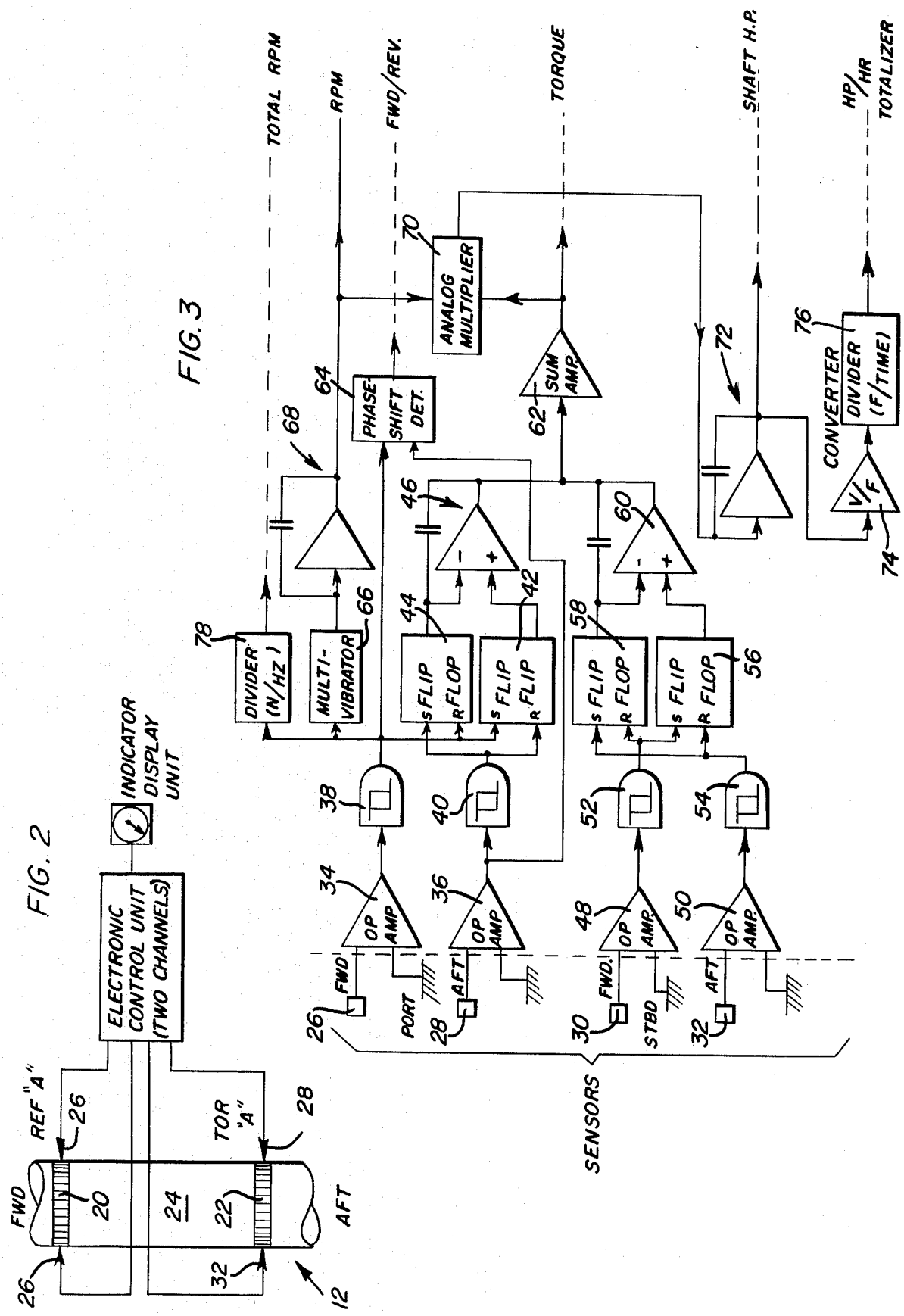

SHIP EFFICIENCY ANALYZER

BACKGROUND OF THE INVENTION

1. Field of the Invention

This invention relates to efficiency monitoring systems for power plants.

2. Discussion of Related Art

Fuel cost being a dominant factor in vessel operation has stirred interest in steam plants with multiple stages of feed heating and re-heat steam plants. It is not feasible to immediately modify the many modern steam powered merchant vessels in service by use of additional feed heater or re-heaters. Therefore, the operator must attempt to operate his existing steam powered vessels in the most efficient manner possible. The bottom line used to express a vessel's overall fuel efficiency is tons of fuel consumed per cargo ton mile. Although this figure is very useful to the owner in determining his operating costs, it contains too many variables to be used by shipyard personnel. Therefore, a less complex indication of fuel efficiency would be useful to allow the ship's crew to make adjustments in operation necessary to achieve the best heat possible efficiency.

An accurate indication of the actual fuel rate of the propulsion plant is a very useful tool for the operating engineer. During acceptance trials, the shipyard takes horsepower and fuel consumption readings and calculates an average fuel rate for certain specified conditions. These readings are averaged usually over a 15-minute period, to avoid the flucuations that usually occur. The trial rates are then normally corrected to standard conditions in accordance with SNAME recommendations.

It has been found that steam plants tend to gradually increase in fuel rate over a period of operation due to fouling of heat exchangers, wearing of pumps, and poor plant operation. Even though the operating engineer may attempt to operate the plant in an efficient manner, he cannot determine when changes or overhauls are necessary without accurate fuel rate data.

Several systems have been proposed for determining the torque, horsepower and specific fuel rate associated with a power plant. For instance, U.S. Pat. No. 3,683,684, issued Apr. 15, 1972, to Judlowe, shows a measuring apparatus which includes a vibrating wire transducer secured around the periphery of a coupling shaft. Digital circuitry is provided to generate a pulse train having a frequency proportional to the square of the vibrating wire to develop torsion information. A rotational shaft speed signal is utilized in conjunction with the output of the vibrating wire transducer to provide a signal proportional to horsepower. A fuel rate meter of the positive displacement type is employed to produce a direct measure of fuel flow. The specific fuel rate signal is computed to determine the horsepower-fuel flow quotient.

U.S. Pat. No. 3,972,224, issued Aug. 3, 1976, to Ingram, shows a shaft efficiency monitoring system which includes a husk assembly associated with the shaft and provides electrical signals proportional to shaft torque, A tachometer provides electrical signals proportional to shaft rotational speed and electrical circuitry multiplies the torque signals by the rpm signal to determine shaft horsepower. A dividing network divides the shaft horsepower signal into an electrical signal representing the rate of fuel consumption to provide a continuous indication of instantaneous system efficiency.

SUMMARY OF THE INVENTION

One object of the present invention is to provide a fuel rate monitoring system employing a combination of sensors which will provide the best possible accuracy and the repeatability.

A further object of the present invention is to provide a fuel rate monitoring system which gives a plant operator data in a usable form so that an operator is able to note plant changes and visually monitor the results, such as gradual changes in fuel rate as a plant steadies out under new operating conditions.

An even still further object of the present invention is to provide a fuel rate monitoring system which can accept secondary inputs to identify an area or component which contributes to a drop in efficiency.

Another still further object of the present invention is to provide a fuel rate monitoring system which is highly accurate in use yet has sufficient mechanical simplicity to enable rapid installation and simplicity of maintenance.

In accordance with the above objects, the fuel rate monitoring system of the present invention comprises a plurality of primary sensors, the outputs of which are evaluated to produce information describing the plant efficiency at any given moment. The primary sensors include shaft torque, shaft revolutions per minute, fuel flow, fuel temperature and ship's speed. Each of these sensors is specifically chosen for high accuracy and reliability. The outputs of the primary sensors are utilized to provide primary output indications of shaft revolutions per minute, shaft horsepower, shaft horsepower hours, power plant efficiency and fuel consumption related to power generated and distance travelled. The primary outputs are displayed in a plurality of manners. Digital displays provide immediate feedback to an engineer to allow the ship's engineer to easily monitor overall plant performance and to take the necessary action to maintain plant efficiency. For instance, if changing over to an alternate fuel feed pump resulted in a higher fuel rate, the higher rate would be instantly displayed on the system monitor. Likewise, small changes in shaft rpm, resulting in disproportionately large changes in fuel rate due to throttling losses in the main turbine inlet valves would also be apparent. Furthermore, data output storage devices such as strip chart recorders and tape storage are provided to enable comparisons of ongoing fuel consumption with previously recorded results.

The system is also capable of storing known efficiency curves or bench mark values for comparison with the primary sensor outputs. Any deviations from these established efficiency curves or bench mark values will be immediately apparent, as would any corrective measures taken by the ship's engineer to improve performance.

Once the overall plant efficiency has been determined by the primary sensors, and a decrease in efficiency is reported out, then identifying an area or component which is contributing to the drop in efficiency becomes a trouble-shooting routine which utilizes a plurality of secondary sensors for indicating specific power plant operating characteristics such as pressures, temperatures, etc. The secondary sensor accuracy is not as important as repeatability. As long as a sensing device can consistently report a performance change, that change can be interpreted as to the impact on the total system and thus the location of the problem can be defined. For instance, when the primary sensors accurately report a reduction in efficiency of the plant, the secondary sensors can be checked for an indication of a change in sensor output. Once such a change has been located, the area of the plant associated with that sensor would be more thoroughly analyzed to determined the cause in reduction of efficiency.

It should be noted that while the system is described as it relates to a marine propulsion plant, the use of the system is not limited thereto. The system can be used with any propulsion facility where fuel is used to produce energy in the form of a rotating device (shaft), regardless of how the device is used. Pumping stations, electrical generating stations, etc., would be included in this category.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a block diagram of the torque meter of the present invention.

FIG. 3 is a block diagram of the circuitry of the torque meter of FIG. 2.

DESCRIPTION OF THE PREFERRED EMBODIMENT

Figure 1:
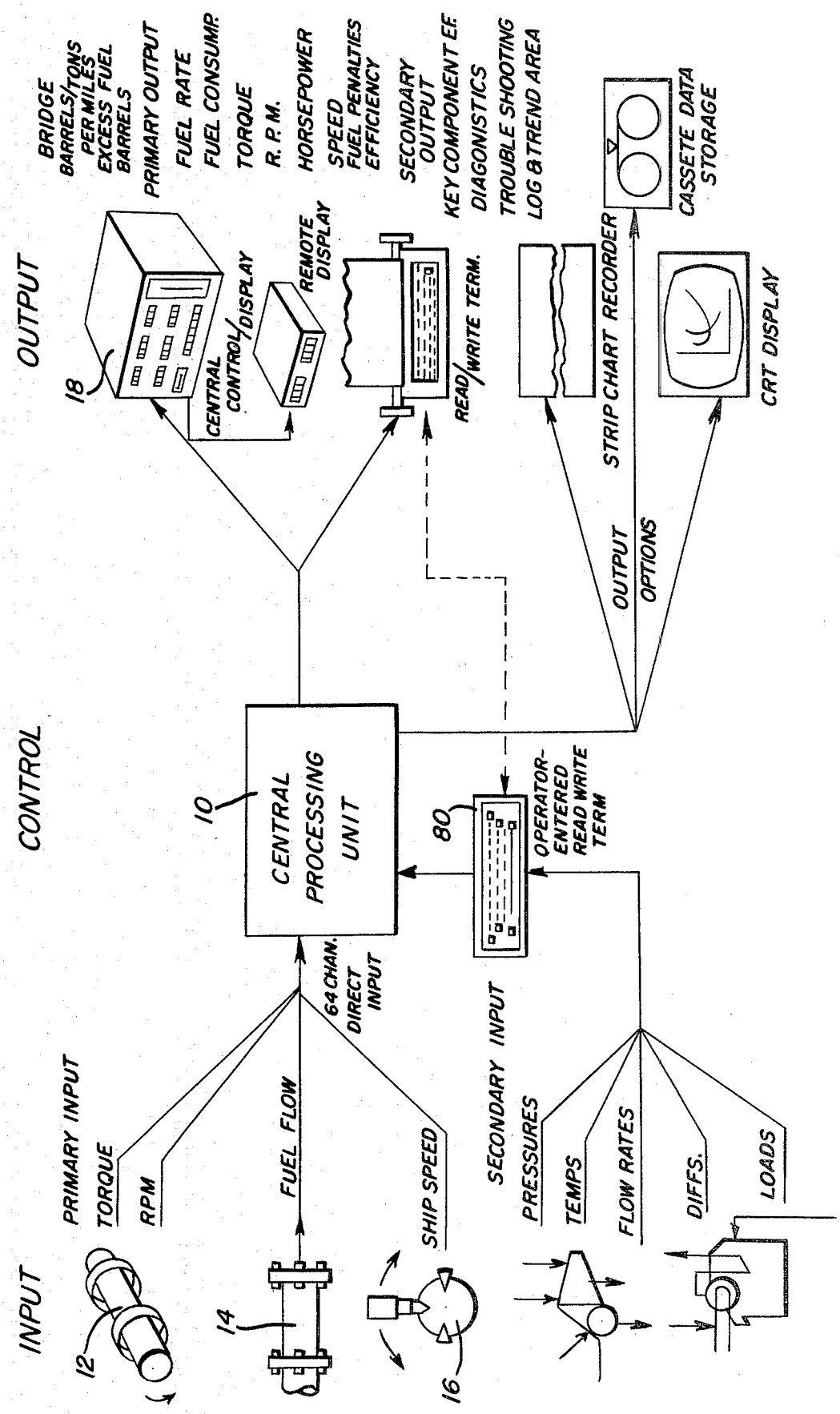
FIG. 1 is a block diagram representation of the overall system operation.

Now with reference to the drawings, a fuel rate monitoring system incorporating the principles and concepts of the present invention will be described in detail. With particular reference to FIG. 1, the overall system will be seen to comprise a central processing unit 10 in the form of a microprocessor having a plurality of primary inputs and a plurality of secondary inputs. The primary inputs constitute real time data including the output of torquemeter 12 which is mounted on the main ship propulsion shaft and produces real time signals proportional to the torque transmitted through the propulsion shaft and the rpm of the propulsion shaft. These signals are sent to the cpu 10 for processing. Further, a fuel flow sensor 14 located on the main plant fuel supply line provides a signal proportional to gallons of fuel per hour or gallons of fuel per minute. This signal is also supplied to the cpu 10. The third primary input is a ship's speed indicator shown generally at 16. The ship's speed is also provided to cpu 10. Cpu 10 produces a plurality of primary outputs which are instantaneously displayed upon central control and display panel 18. The primary outputs include signals indicative of fuel rate which is defined as pounds of fuel per ship hour or grams of fuel per metric ship hour. The fuel rate signals are integrated over a 10- to 15-minute sampling period to compensate for momentary fluctuations. A fuel consumption signal, defined as the total fuel consumption as it relates to speed and distance is provided by using the fuel flow and ship's speed inputs. This number can be expressed as long tons per mile. A third output comprises a torque reading taken from torquemeter 12. An rpm reading is taken from the torquementer also. The torque and rpm signals are combined appropriately to provide a shaft horsepower signal which comprises a fifth output. The ship's speed comprises a sixth primary output for the system, with fuel penalties and power plant efficiency reading being the seventh and eighth outputs.

With reference to FIGS. 2 and 3, a more detailed explanation of the torquemeter 12 will now be given. Torquemeter 12 is essentially the device disclosed in allowed U.S. application, Ser. No. 925,504, filed July 17, 1978, the disclosure of which is incorporated herein by reference. The torquemeter comprises two prerecorded magnetic tapes 20 and 22 which are mounted on the forward and aft ends of ship propulsion shaft 24. Tapes 20 and 22 are attached to the shaft to form two loops and are the only components of the system in physical contact with the shaft. Each type has a prerecorded sinusoidal signal on it and is in operative engagement with a pair of playback heads with the playback heads in each pair being mounted at 180° intervals on the shaft as shown as 26, 28 and 30, 32. The outputs of sensing heads 26 and 28 are amplified by operational amplifiers 34 and 36, respectively, then passed through Schmidt triggers 38 and 40 to flip-flops 42 and 44 which produce square waves delayed in time proportional to a phase shift between the sine wave signals from the forward and aft heads 26, 28. The signals are integrated by integration circuit 46 and, in like manner, the signals from forward and aft sensors 30 and 32 are passed through amplifiers 48 and 50 to Schmidt triggers 52 and 54, then through flip-flops 56 and 58 to integrator 60. The outputs of integrators 46 and 60 are each proportional to one-half of the shaft torque ±, respectively, voltage errors due to shaft skew. The signals from the integrators are added in summation amplifier 62 which produces an output proportional to torque. The use of paired flip-flops 42, 44 and 56, 58 enables forward or reverse operation of the system. The outputs of either pair of sensors 26, 28 or 30, 32 can be compared in a phase shift detector as shown at 64 to provide an indication of forward or reverse operation of the shaft.

A rpm signal is derived from the torque meter 12 by taking the output of any Schmidt trigger 38, 40, 52 or 54 and actuating a single shot multivibrator 66. The output of the multi-vibrator is integrated in integration network 68 with the output of the integrator providing an analog rpm signal. To achieve system redundancy, multiple circuits for rpm may be used.

A direct reading of shaft horsepower is obtained using the functions of shaft speed (rpm) and torque and working on the principle that power delivered from an engine is determined by the formula:

$$\text{Horsepower} = \frac{\text{Torque (ft lb)} \times \text{rpm}}{5252}$$

An analog multiplier 70 is used in the circuit to accomplish this multiplication and provides a DC voltage to drive a meter or to input a signal to the central processing unit. The derived horsepower signal is accurate to ±0.5%. Linearity will be typically 0.1%. The output of the multiplier 70 is integrated by network 72 over a period of typically 10 to 15 minutes in order to eliminate the effect of short duration variations. Total units of horsepower during any time period (hours are standard) ar complied by a shaft horsepwer totalizer comprising voltage to frequency converter 74 and divider 76. Divider 76 would be set to divide the output of the voltage to frequency converter by the known frequency output of the converter equivalent to one horsepower per time unit chosen.

Finally, a total rpm output is obtained by simply dividing the output of any Schmidt trigger 38, 40, 52 or 54 by the number of cycles recorded on tapes 20, 22. This can be performed by a divider 78 shown connected to the output of Schmidt trigger 38. The divided signal can be stored in a counter which would give a running total of shaft revolutions which is divided by a figure representative of running time of the shaft to provide a total rpm count, if desired.

A sonic-type flow meter senses the flow rate of liquid from outside the fuel supply pipe and is the preferred sensor for measuring fuel flow since it does not require intrusion of a sensing device. Detection of flow rate is made by two transducers which generate an ultrasonic pulse through the pipe wall and liquid and, in turn, detect the movement of sonically reflective bubbles or solids in the liquid.

Figure 4:
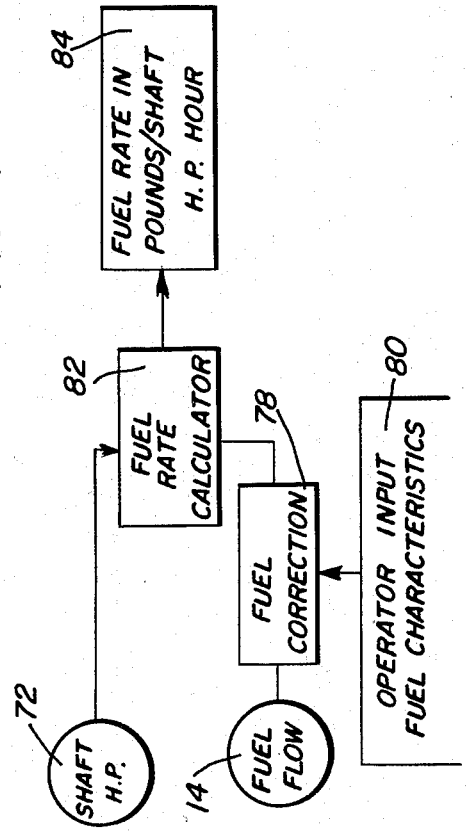
FIG. 4 is a block diagram of the fuel rate in terms of elapsed time determining apparatus of the present invention.

FIG. 4 shows the manner in which the fuel rate output is derived. The integrated shaft horsepower signal from 72 is combined with a fuel flow signal from 14 to provide a fuel rate given in pounds per shaft horsepower hour. The fuel flow signal from sensor 14 will be expressed in gallons per hour. As such, it is necessary to convert this to a pounds per hour measurement. This is accomplished by fuel correction block 78 which receives operator input fuel characteristic signals through block 80 which constitutes operator input console 80 shown in FIG. 1. The input fuel characteristics such as specific gravity and higher heating value (HHV) of the fuel being used are stored and utilized to produce an output from block 78 indicative of pounds of fuel per hour. Fuel rate calculater block 82 divides the inputs from 72 and 78 and produces an output to display block 84 which may be any of the display devices shown in FIG. 1.

Fuel rate cannot stand by itself as an indication of propulsion plant efficiency. 100% plant efficiency is the optimum performance of machinery within the propulsion plant at the level of power developed. Different levels of power will produce different fuel rates due to changes in operating efficiencies of machinery in the propulsion chain at varying power requirements.

An example, a ship with a maximum capability of 32,000 SHP may be able to achieve a fuel rate of 0.460 when operated at a power level of 32,000 SHP. However, if the vessel is operated at a reduced power level of 25,000 SHP, the best achievable fuel rate may be 0.474. Therefore when operating at 32,000 SHP 100% plant efficiency is equal to a fuel rate of 0.460 while operation at 25,000 SHP 100% plant efficiency is equal to 0.474.

The ship efficiency analyzer programs the optimum obtainable fuel rate at each power level so that the achieved fuel rate is compared to this benchmark and expressed as a percentage of plant efficiency. The fuel rate number by itself is not directly comparable with other fuel rate numbers unless the power level is considered. The plant efficiency number produced by the ship efficiency analyzer will serve as an indication of the overall efficiency of the propulsion plant regardless of the power setting.

The plant efficiency number enables a ship's personnel to simply see the overall efficiency of the propulsion plant in real time. Tuning, adjustments, repairs, and degradations can be observed as to their effect on plant efficiency and fuel consumption. Improvements in operating practices and/or new machinery may bring plant performance to a never before achieved high in efficiency. The ship efficiency analyzer plant efficiency number may then exceed 100% but could be easily reprogrammed so that this new high in efficiency would serve as the benchmark representing 100%.

While measurement of ship speed is not required by the system for determining propulsion plant efficiency, a measure of fuel consumption as it relates to speed and distance is a factor in pinpointing external causes of fuel penalties, such as hull fouling, sea state, rudder or propeller damage, etc. If an accurate on board ship's speed sensor generally referred to in FIG. 5 at 86 is available in the form of a doppler effect or correlation sonar or a shipboard EM meter, this may be used as a direct measure of ship's speed. Alternatively, true measure of rpm can be used to determine ship's speed when the value for apparent slip of the propeller can be obtained by the use of the formula:

$$S = \frac{(pN - 101.3 \, V)}{pN}$$

Where S equals an apparent slip ratio, p equals propeller pitch, N equals propeller rpm, V equals ship's speed (knots). Sea trial information for each vessel can be used to extract accurate data for finding a constant factor for apparent slip throughout the speed range. Apparent slip and propeller rpm are then used in the equation $$V = \frac{Np (1 - S)}{101.3}$$

Figure 5:
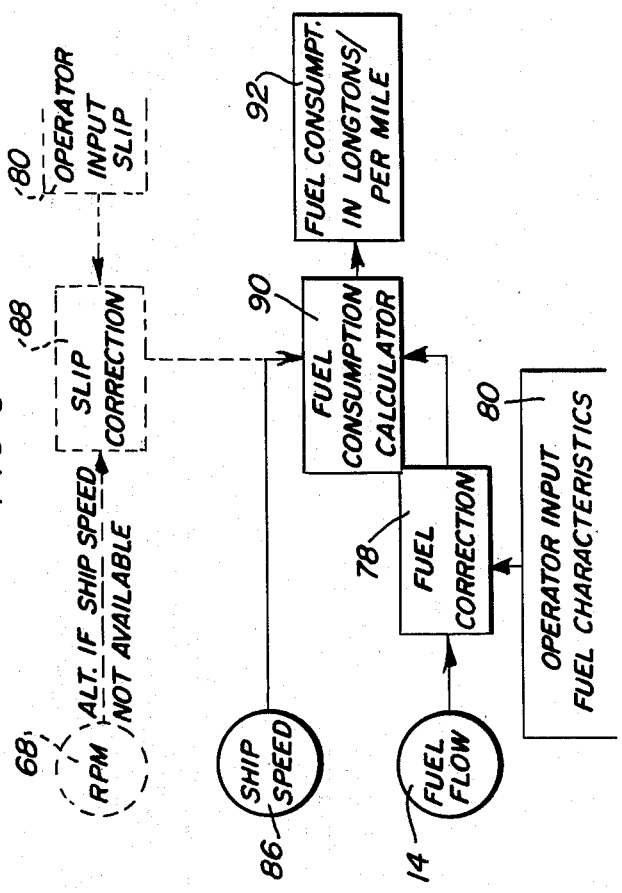
FIG. 5 is a block diagram of the fuel consumption in terms of distance travelled determining apparatus of the present invention.

FIG. 5 shows the manner in which the ship's speed is calculated through the use of the rpm output of integrator 68 and a manual operator input of slip factor. These inputs are used in slip correction block 88 to calculate ship's speed according to the above equation. The ship's speed, whether taken from block 88 or directly from the ship's speed sensor 86, is presented to fuel consumption calculator block 90 which also receives an input from fuel correction block 78 to produce an output of fuel consumption in long tons per mile which is caused to be displayed by display block 92.

Figure 6:
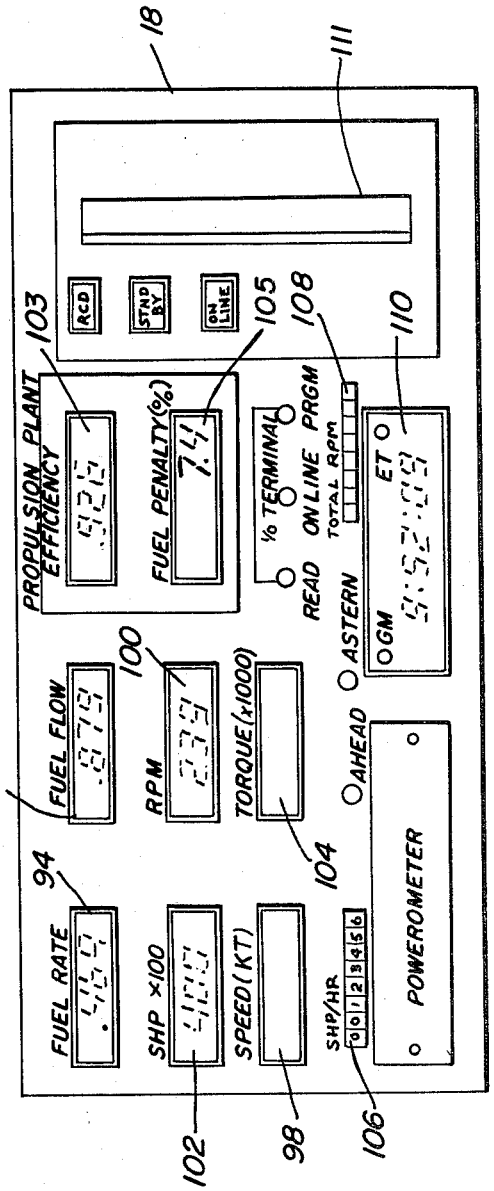
FIG. 6 is a typical central control display panel used in the present invention.

Again, with reference to FIG. 1 and with reference to FIG. 5, it will be noted that all of the primary inputs are directed to cpu 10. The above calculations discussed with reference to FIGS. 3, 4 and 5 can, of course, be performed by appropriate programming of the cpu. The display panel 18, the face of which is shown in detail in FIG. 6, is provided with eight LED readout meters for immediate and constant display of the calculated data. These meters include display 94 for fuel rate indication, display 96 for the fuel consumed, display 98 for speed in knots, display 100 for shaft rpm, display 102 for the shaft horsepower, display 103 for plant efficiency, display 104 for torque and display 105 for fuel penalty. In addition, two dial meters 106 and 108 display total horsepower/hours and total rpm, respectively. An LED clock/calender display 110 is also included on the control panel. The clock/calender signal is inputted into the cpu for interval control and for dating printed output. At the same time as this information is being displayed by central display panel 18, the information can also be recorded by the use of printers, strip chart recorders or tape storage units, as clearly depicted in FIG. 1.

The system also includes secondary inputs as shown in FIG. 1. These secondary inputs are related to internal power plant operating parameters such as internal pressures, temperatures, flow rates, differentials, loads, etc. and are used in diagnosing fuel penalties sensed through the primary inputs. This can easily be accomplished by use of a diagnostic routine which monitors the plant fuel rate as well as each of the secondary inputs. Upon sensing an increase in fuel rate, a corresponding degradation in a system component indicated by one of the secondary inputs would be sensed and correlated with the fuel rate change to provide an indication of the source of the sensed fuel penalty. The use of long term data storage devices such as a strip chart recorder or magnetic tape storage or floppy disc, shown at 111 in FIG. 6, is useful in analyzing long term changes in power plant efficiency versus changes in secondary input levels to provide an indication of a need for engine overhauls and an indication of the specific areas of the power plant needing such overhauls. Further, long term monitoring of the fuel consumed output on the strip chart recorder or magnetic tape provides extremely valuable information relating to hull fouling.

Various programs can be entered through use of terminal 80 for either automatically or manually timed diagnosis routines. Also, a 16-character alpha-numeric LED display (not shown) is provided to display all command routines prompted by the operator controlled terminal, selected data from internal computations and time controlled functions, and acts as a message readout for programmed information as required.

EXAMPLE OF MANNER OF USE

The system serves to point out a general deterioration of ship performance due to hull fouling. First, as the hull fouling occurs, the fuel consumption per mile readout will gradually increase for the same speeds. The system will give the everyday record of the use of unnecessary fuel due to hull fouling allowing a decision to be made when to have the hull cleaned. This information is permanently recorded and can be given to engineering and operations personnel. The system automatically records the increase in excess fuel. Land based personnel can therefore get exactly the same information which is available to the ship personnel.

The readout will also show larger amounts of fuel per mile being consumer at high speeds. Large amounts of fuel can be saved by sacrificing only fractions of a knot in speed. The systems allows the operator to see the actual instantaneous fuel consumption rate and avoid the tendencies to run at speeds higher than necessary in order to assure that schedules are maintained. The system readouts also give the ship operator the option to regulate the ship's speed coming into and out of harbors, channels, waterways, etc. to save fuel.

The propulsion plant efficiency figure is a continuous live indication of the overall propulsion plant performance as it relates to fuel use. The Chief Engineer can see a change in the propulsion plant efficiency as it occurs and is provided with the opportunity to make adjustments to improve plant performance and save fuel.

The propulsion plant efficiency figure eliminates errors caused by inaccurate sensors and human errors involved in collecting, logging and calculating information obtained from these sensors. The propulsion plant efficiency figure also eliminate the delays involved in gathering, calculating and analyzing data to determine propulsion plant performance.

The propulsion plant efficiency readout will assist in attempts at tuning the propulsion plant to maximum efficiency. Any adjustments of the elements in the propulsion cycle will show the results as an increase or a decrease to the plant efficiency figure. A decrease in the readout can be observed allowing the engineer to determine when changes or overhauls are needed. If the propulsion plant efficiency readout does not indicate a decrease, unnecessary and expensive machinery teardown can be avoided.

In the operator's efforts to discover the cause of a decrease in plant performance, the propulsion plant efficiency readout serves as an effective tool. For example, if substituting auxiliary or standby equipment (such as an auxiliary feed pump into the propulsion cycle) results in improved plant efficiency then inspection and a possible overhaul of the original equipment would be indicated.

The propulsion plant efficiency readout will increase or decrease instantly when a new fuel saving device (emulsifiers, chemical additives, etc.) has been installed in the propulsion plant. Evaluation of new products can be accomplished immediately and registered on the readout as to how much, if any, fuel is saved. Should these products after a period of time become a new source of fuel efficiency, the readout will register the decrease.

The fuel rate readout is registered in pounds of fuel per shaft horsepower hour. The fuel rate readout serves to indicate various changing load conditions. For example, an increase in the electrical load caused by additional refrigerated container units, etc. will cause an increase in the fuel rate readout. Also, the effects of different types of fuel will be made apparent. As fuel quality is lowered, an increase in the pounds of fuel per shaft horsepower hour readout will occur.

The torque readout is valuable for indicating overtorqueing of the line shaft bearings, gears, etc. beyond their design limits which can be caused by shallow waters. The readout also serves as a reminder that at a constant rpm an increase in torque requires increased fuel consumption.

Trending is accomplished by establishing permanent records of the voyage to compare with previous voyages. This will reflect how fuel efficient the ship is being operated and assist the operator in making fuel saving adjustments. A periodic record approximately every four hours, should be made recording the barrels of fuel used per mile, speed, time, total distance travelled, total fuel used, total cargo and the propulsion plant efficiency.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a power plant having at least one main power transmitting drive shaft, a power plant efficiency monitoring system comprising:

RPM sensor means for sensing the rpm's of said drive shaft;

torque sensing means for sensing the torque transmitted by said drive shaft;

fuel flow sensing means for sensing the rate of fuel supplied to said power plant;

first calculation means for calculating fuel use of said power plant in terms of power transmitted by said drive shaft;

display means for displaying said sensed rpm, said second torque, and said calculated fuel use in terms of power transmitted;

storage means for storing indications of said calculated fuel use in terms of power transmitted;

secondary sensor means for measuring levels of internal parameters of said power plant; and means for storing said measured levels of said internal parameters and correlating changes in said internal parameters with changes in said calculated fuel use in terms of power transmitted.

2. The invention defined in claim 1 and further wherein said power plant is a marine power plant contained in a marine vessel; speed sensing means for sensing the speed of said vessel; and second calulation means for calculating fuel use of said power plant in terms of distance travelled by said vessel.

3. The invention defined in claim 2 wherein said storage means further stores indications of said calculated fuel use in terms of distance travelled.

4. The invention defined in claim 3 wherein said storage means includes a strip chart recorder, cassette and floppy disc storage devices.

5. The invention defined in claim 2 and further wherein said first calculation means includes multiplication means for producing a shaft horsepower signal by multiplying the outputs of said rpm sensor means and said torque sensing means.

6. The invention of claim 1 and further including means for storing optimum operating levels for said internal parameters; and means for comparing said measured levels of said internal parameters with said optimum operating levels.

7. The invention defined in claim 1 wherein said torque sensing means includes a pair of tapes having pre-recorded periodic signals thereon attached in loops circumferentially of said drive shaft at positions spaced longitudinally of said drive shaft; one sensor head means operatively associated with each of said pre-recorded tapes for sensing said periodic signal; and phase comparison means for sensing the phase difference between said periodic signals to give an indication of torque transmitted by said shaft.

8. The invention defined in claim 7 and further wherein said rpm sensor means includes an output from one of said sensor head means.

9. The invention defined in claim 8 wherein said rpm sensor means further includes a multivibrator connected to said output of one of said sensor head means and an integrator means for integrating the output of said multivibrator.

10. The invention defined in claim 8 and further wherein said fuel flow sensing means comprises a sonic flow meter.

* * * * *